US009857162B1

(12) United States Patent
Gum et al.

(10) Patent No.: US 9,857,162 B1
(45) Date of Patent: Jan. 2, 2018

(54) MOBILE DEVICE POSITIONING USING MODULATED LIGHT SIGNALS AND COARSE POSITIONING INFORMATION

(71) Applicant: QUALCOMM Incorporated, San Diego, CA (US)

(72) Inventors: Arnold Gum, San Diego, CA (US); Bala Ramasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/273,006

(22) Filed: Sep. 22, 2016

(51) Int. Cl.
| H04B 10/116 | (2013.01) |
| G01B 11/00 | (2006.01) |
| G01B 11/14 | (2006.01) |
| G01C 21/34 | (2006.01) |
| G01C 21/36 | (2006.01) |
| H04W 4/04 | (2009.01) |
| H04W 84/14 | (2009.01) |
| H04W 84/12 | (2009.01) |

(52) U.S. Cl.
CPC ............ *G01B 11/002* (2013.01); *G01B 11/14* (2013.01); *H04W 4/04* (2013.01); *G01C 21/3423* (2013.01); *G01C 21/362* (2013.01); *G01C 21/3667* (2013.01); *H04B 10/116* (2013.01); *H04W 84/12* (2013.01)

(58) Field of Classification Search
CPC .. G01B 11/002; G01B 11/14; G01C 21/3423; G01C 21/362; G01C 21/3667; H04B 10/116; H04W 4/04; H04W 84/12
USPC ......................................................... 398/118
See application file for complete search history.

(56) References Cited

U.S. PATENT DOCUMENTS

| 2008/0281515 A1* | 11/2008 | Ann ....................... G01C 21/20 |
| | | 701/434 |
| 2012/0089325 A1 | 4/2012 | Won et al. |
| 2013/0279917 A1 | 10/2013 | Son et al. |
| 2014/0085642 A1 | 3/2014 | Kim et al. |
| 2014/0280316 A1* | 9/2014 | Ganick ............. G06F 17/30522 |
| | | 707/769 |
| 2014/0375982 A1 | 12/2014 | Jovicic et al. |
| 2015/0003832 A1* | 1/2015 | Yamasaki ............ H04B 10/116 |
| | | 398/115 |

(Continued)

FOREIGN PATENT DOCUMENTS

WO        2015082914 A1       6/2015

*Primary Examiner* — Dalzid Singh
(74) *Attorney, Agent, or Firm* — MG-IP Law, P.C.

(57) ABSTRACT

Disclosed are systems and methods for tracking position of a mobile device within a venue. In an aspect, the mobile device obtains a plurality of light source identifiers and a plurality of location identifiers corresponding to a plurality of light sources within the venue, determines a first position of the mobile device within the venue, the first position having a first position accuracy, determines a subset of the plurality of light source identifiers corresponding to a subset of the plurality of light sources based on a location of each light source in the subset of light sources being within a threshold distance of the first position, demodulates a fragment of a light source identifier, and determines a second position of the mobile device based on one or more location identifiers corresponding to the light source, the second position having a greater position accuracy than the first position accuracy.

30 Claims, 7 Drawing Sheets

(56) References Cited

U.S. PATENT DOCUMENTS

| | | | |
|---|---|---|---|
| 2015/0147067 A1* | 5/2015 | Ryan | H04B 10/116 398/118 |
| 2015/0324642 A1 | 11/2015 | Jovicic et al. | |
| 2015/0349883 A1* | 12/2015 | Mitchell | H04B 10/116 398/118 |
| 2016/0028477 A1* | 1/2016 | Jovicic | H04B 10/116 398/118 |
| 2016/0249164 A1* | 8/2016 | Jovicic | H04W 4/023 |
| 2017/0055334 A1* | 2/2017 | Pandharipande | H05B 37/0272 |
| 2017/0099572 A1* | 4/2017 | Breuer | H04W 4/02 |
| 2017/0139033 A1* | 5/2017 | Lydecker | G01S 5/16 |
| 2017/0180047 A1* | 6/2017 | Aoyama | H04B 10/116 |

\* cited by examiner

MOBILE DEVICE POSITIONING USING MODULATED LIGHT SIGNALS AND COARSE POSITIONING INFORMATION

INTRODUCTION

Aspects relate to mobile device positioning using modulated light signals and coarse positioning information.

Determining the position of a mobile device in an indoor environment can be useful in a number of applications, such as navigating mobile phone users in office/commercial environments, enabling customers to find items in a supermarket or retail outlet, coupon issuance and redemption, customer service and accountability, etc. However, achieving precise position estimates can be a challenging task. Indoor positioning is typically achieved using radio frequency (RF) signals received from Wi-Fi access points (or similar means). A drawback to this technique is that it requires mobile devices to learn RF signal propagation parameters, which presents a significant technical challenge for achieving high precision (<1 m) position accuracy

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A method for tracking a position of a mobile device within a venue includes obtaining, by the mobile device, a plurality of light source identifiers and a plurality of location identifiers corresponding to a plurality of light sources within the venue, each light source identifier and each location identifier corresponding to a light source of the plurality of light sources, determining, by the mobile device, a first position of the mobile device within the venue, the first position having a first position accuracy, determining, by the mobile device, a subset of the plurality of light source identifiers corresponding to a subset of the plurality of light sources based, at least in part, on a location of each light source in the subset of light sources being within a threshold distance of the first position, demodulating, by the mobile device, a first fragment of a light source identifier, and determining, by the mobile device, based on the first fragment unambiguously mapping to a first light source identifier within the subset of the plurality of light source identifiers, a second position of the mobile device based, at least in part, on one or more location identifiers of the plurality of location identifiers corresponding to a first light source of the subset of the plurality of light sources corresponding to the first light source identifier, the second position having a second position accuracy that is greater than the first position accuracy.

An apparatus for tracking a position of a mobile device within a venue includes a light sensor, a transceiver configured to obtain a plurality of light source identifiers and a plurality of location identifiers corresponding to a plurality of light sources within the venue, each light source identifier and each location identifier corresponding to a light source of the plurality of light sources, and at least one processor configured to: determine a first position of the mobile device within the venue, the first position having a first position accuracy, determine a subset of the plurality of light source identifiers corresponding to a subset of the plurality of light sources based, at least in part, on a location of each light source in the subset of light sources being within a threshold distance of the first position, demodulate a first fragment of a light source identifier detected by the light sensor, and determine, based on the first fragment unambiguously mapping to a first light source identifier within the subset of the plurality of light source identifiers, a second position of the mobile device based, at least in part, on one or more location identifiers of the plurality of location identifiers corresponding to a first light source of the subset of the plurality of light sources corresponding to the first light source identifier, the second position having a second position accuracy that is greater than the first position accuracy.

An apparatus for tracking a position of a mobile device within a venue includes a communication means configured to obtain a plurality of light source identifiers and a plurality of location identifiers corresponding to a plurality of light sources within the venue, each light source identifier and each location identifier corresponding to a light source of the plurality of light sources, and a processing means configured to: determine a first position of the mobile device within the venue, the first position having a first position accuracy, determine a subset of the plurality of light source identifiers corresponding to a subset of the plurality of light sources based, at least in part, on a location of each light source in the subset of light sources being within a threshold distance of the first position, demodulate a fragment of a light source identifier, and determine, based on the fragment unambiguously mapping to a light source identifier within the subset of the plurality of light source identifiers, a second position of the mobile device based, at least in part, on one or more location identifiers of the plurality of location identifiers corresponding to a light source of the subset of the plurality of light sources corresponding to the light source identifier, the second position having a second position accuracy that is greater than the first position accuracy.

A non-transitory computer-readable medium for tracking a position of a mobile device within a venue includes at least one instruction to cause the mobile device to obtain a plurality of light source identifiers and a plurality of location identifiers corresponding to a plurality of light sources within the venue, each light source identifier and each location identifier corresponding to a light source of the plurality of light sources, at least one instruction to cause the mobile device to determine a first position of the mobile device within the venue, the first position having a first position accuracy, at least one instruction to cause the mobile device to determine a subset of the plurality of light source identifiers corresponding to a subset of the plurality of light sources based, at least in part, on a location of each light source in the subset of light sources being within a threshold distance of the first position, at least one instruction to cause the mobile device to demodulate a fragment of a light source identifier, and at least one instruction to cause the mobile device to determine, based on the fragment unambiguously mapping to a light source identifier within the subset of the plurality of light source identifiers, a second position of the mobile device based, at least in part, on one or more location identifiers of the plurality of location identifiers corresponding to a light source of the subset of the plurality of light sources corresponding to the light source identifier, the second position having a second position accuracy that is greater than the first position accuracy.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
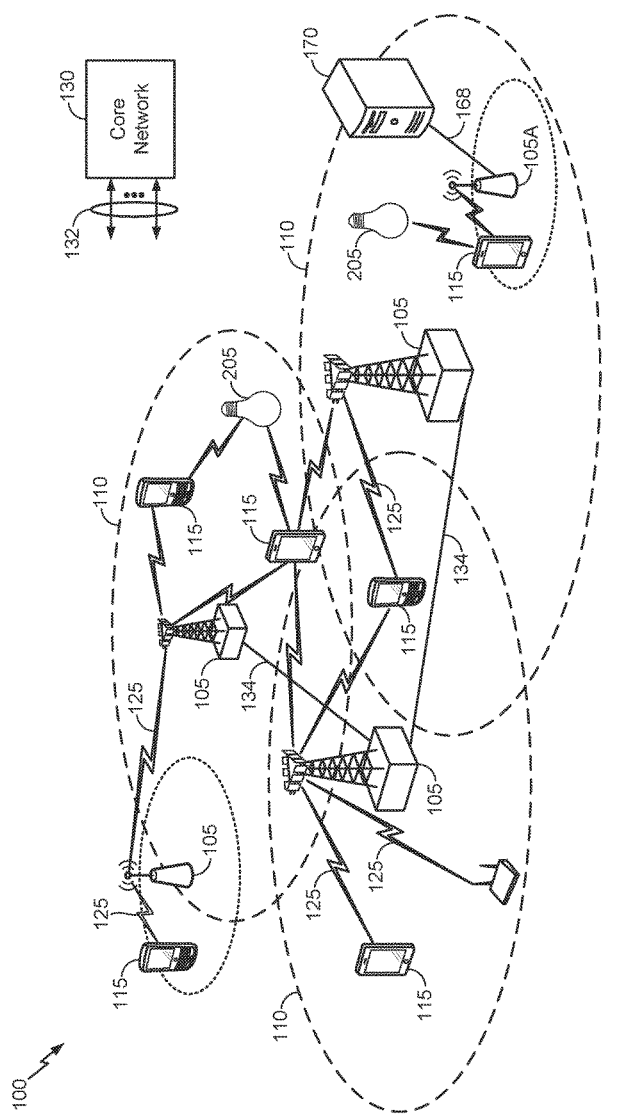
FIG. 1 shows a first block diagram of a wireless communications system in accordance with an aspect of the disclosure.

Disclosed herein are systems and methods for tracking a position of a mobile device within a venue. In an aspect, the mobile device obtains a plurality of light source identifiers and a plurality of location identifiers corresponding to a plurality of light sources within the venue, each light source identifier and each location identifier corresponding to a light source of the plurality of light sources, determines a first position of the mobile device within the venue, the first position having a first position accuracy, determines a subset of the plurality of light source identifiers corresponding to a subset of the plurality of light sources based, at least in part, on a location of each light source in the subset of light sources being within a threshold distance of the first position, demodulates a fragment of a light source identifier, and determines, based on the fragment unambiguously mapping to a light source identifier within the subset of the plurality of light source identifiers, a second position of the mobile device based, at least in part, on one or more location identifiers of the plurality of location identifiers corresponding to a light source of the subset of the plurality of light sources corresponding to the light source identifier, the second position having a second position accuracy that is greater than the first position accuracy.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 is a diagram illustrating an example of a wireless communications system 100. The system 100 includes a plurality of access points (e.g., base stations, evolved node Bs (eNBs), or wireless local area network (WLAN) access points) 105, a number of mobile devices 115, and a core network 130. Some of the access points 105 may communicate with the mobile devices 115 under the control of a base station controller (not shown), which may be part of the core network 130 or certain access points 105 (e.g., base stations or eNBs) in various aspects. Some of the access points 105 may communicate control information and/or user data with the core network 130 through backhaul 132. In some aspects, some of the access points 105 may communicate, either directly or indirectly, with each other over backhaul links 134, which may be one or more wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the mobile devices 115 via one or more access point antennas. Each of the access points 105 may provide communication coverage for a respective geographic area 110. In some aspects, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies. The access points 105 may be associated with the same or different access networks. The coverage areas of different access points 105, including the coverage areas of the same or different types of access points 105, utilizing the same or different radio technologies, and/or belonging to the same or different access networks, may overlap.

The system 100 may be a heterogeneous network in which different types of access points 105 provide coverage for various geographical regions. For example, each access point 105 may provide communication coverage for a macro cell, a pico cell, a femto cell, and/or other types of cell. A macro cell generally covers a relatively large geographic area (e.g., several kilometers in radius) and may allow unrestricted access by mobile devices 115 with service subscriptions with the network provider. A pico cell would generally cover a relatively smaller geographic area and may allow unrestricted access by mobile devices 115 with service subscriptions with the network provider. A femto cell would also generally cover a relatively small geographic area (e.g., a home) and, in addition to unrestricted access, may also provide restricted access by mobile devices 115 having an association with the femto cell (e.g., mobile devices 115 in a closed subscriber group (CSG), mobile devices 115 for users in the home, and the like). An access point 105 for a macro cell may be referred to as a macro base station. An access point for a pico cell may be referred to as a pico base station. And, an access point for a femto cell may be referred to as a femto base station or a home base station. An access point may support one or multiple (e.g., two, three, four, and the like) cells.

The core network 130 may communicate with the access points 105 via a backhaul 132 (e.g., S1, etc.). The access points 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The mobile devices 115 may be dispersed throughout the wireless communications system 100, and each mobile device 115 may be stationary (but capable of mobility) or mobile. A mobile device 115 may also be referred to by those skilled in the art as a user equipment (UE), a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless communication device, a handheld device, a tablet computer, a laptop computer, a cordless phone, a wearable item such as a watch or glasses, or the like. A mobile device 115 may be able to communicate with macro base stations, pico base stations, femto base stations, relays, and the like. A mobile device 115 may also be able to communicate over different access networks, such as cellular or other wireless wide area network (WWAN) access networks, or WLAN access networks.

The communication links 125 shown in system 100 may include uplinks for carrying uplink (UL) transmissions (e.g., from a mobile device 115 to an access point 105) and/or downlinks for carrying downlink (DL) transmissions (e.g., from an access point 105 to a mobile device 115). The UL transmissions may also be called reverse link transmissions, while the DL transmissions may also be called forward link transmissions.

A particular small cell access point 105A (e.g., a pico cell, a femto cell, a WiFi access point, etc.) may be located within a venue (e.g., a building, stadium, ship, etc.), not shown in FIG. 1 for simplicity, and connected to a location server 170 over a wired or wireless link 168. The location server 170 may be local to the venue (e.g., physically present at the venue) or remote to the venue (e.g., a third-party server in communication with the small cell access point 105A over, for example, the core network 130). As will be described further herein, the mobile device 115 may obtain location information (also referred to herein as "location identifiers") for one or more light sources 205 installed in the venue from the location server 170 via the small cell access point 105A. The mobile device 115 may optionally store the obtained location information in a local database. The location information can include location coordinates of the one or more light sources, size (e.g., dimensions) of the one or more light sources, orientation of the one or more light sources, shape of the one or more light sources, or any combination thereof.

In some cases, a mobile device 115 may be capable of receiving information-carrying light signals, such as visible light communication (VLC) signals or infrared signals. VLC uses modulated visible light to transmit data. The VLC light source, such as light source 205, is typically a light-emitting diode (LED), although other sources, such as fluorescent light bulbs, may, in some cases, be utilized. Reception at the mobile device 115 is typically based on photodiodes, either individually or in a digital camera sensor or other array of photodiodes, such as those found in cell phones and digital cameras. Arrays of photodiodes may, in some cases, be utilized to provide multi-channel communication and/or spatial awareness relating to multiple VLC light sources.

When illuminated by a light source 205 capable of transmitting an information-carrying light signal, such as a VLC signal, the mobile device 115 may receive and decode the light signal to obtain identification information for the light source 205. The identification information contained in the light signal may in some cases include a repeated codeword that identifies the light source 205. As will be described further herein, the identification information may enable the mobile device 115 to determine the location of the light source 205 (e.g., by looking up the location in a local database or retrieving the location from the location server 170). By identifying the angle of arrival of the light signal, the mobile device 115 may be able to determine positioning information based on the light signal. In some cases, the positioning information may include a direction of one or more light sources 205 with respect to the mobile device. In some cases, the positioning information may also or alternately include an estimate of the distance from the mobile device 115 to one or more light sources 205. In some cases, the mobile device 115 may receive light signals from more than one light source 205 and determine additional positioning information, such as the location of the mobile device 115.

Figure 2:
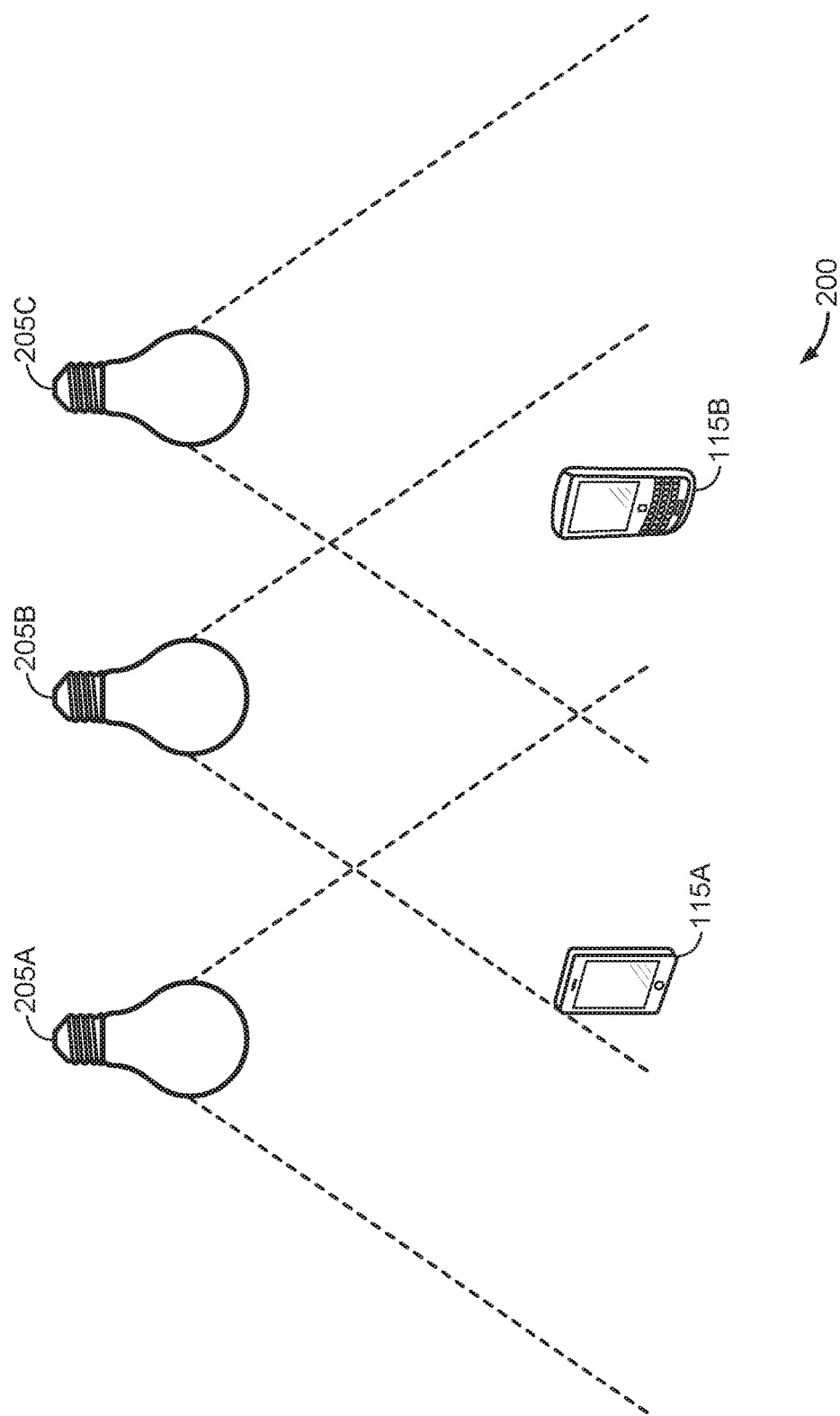
FIG. 2 shows an elevation of a number of mobile devices, each of which may be illuminated by one or more of a number of light sources in accordance with various aspects of the disclosure.

Turning now to FIG. 2, there is shown an elevation 200 of a number of mobile devices, represented as mobile devices 115A and 115B, each of which is illuminated by one or more of a number of light sources, represented as light sources 205A, 205B, 205C. Each of the mobile devices 115A and 115B may be illuminated by one or more of the light sources 205A, 205B, and 205C, with the set of light sources that illuminate a particular one of the mobile devices 115A and 115B changing as the mobile device is moved from one position to another. For example, the mobile device 115A is shown as illuminated by the light sources 205A and 205B, and the mobile device 115B is shown to be illuminated by the light sources 205B and 205C.

The mobile devices 115A and 115B may be examples of the mobile devices 115 described with reference to FIG. 1. The light sources 205A, 205B, and 205C may be examples of the light sources 205 described with reference to FIG. 1, and may take various forms. In some aspects, each light source 205 may be a light emitting diode (LED) luminaire, a compact fluorescent lighting (CFL) luminaire, an incandescent luminaire, and/or another form of luminaire. In some cases, the light sources 205 may be suspended from or mounted on a ceiling, wall, desktop, or other surface. Different light sources may be suspended from or mounted on different surfaces. Each of the light sources 205A, 205B, and 205C may also represent a singular luminaire, a combination of luminaires, or a complex array of luminaires as might be found in a television, computer screen, electronic sign or billboard, etc.

Each of the light sources 205A, 205B, and 205C may contain (or be associated with) circuitry for generating a modulated light signal (e.g., an information-carrying light signal), such as a VLC signal or infrared signal. The modulated light signal may be generated using the primary luminaire of the light source 205A, 205B, and 205C, or using a secondary luminaire, such as a luminaire that is provided particularly for the purpose of generating a modulated light signal. In the latter case, and by way of example, a light source 205 might use a CFL luminaire as its primary light producing mechanism and use a light emitting diode (LED) luminaire particularly for the purpose of generating a modulated light signal.

Each of the mobile devices 115A and 115B may include circuitry for receiving and decoding a modulated light signal. The circuitry may in some cases include an image sensor, such as an image sensor containing an array of photodiodes (e.g., a complementary metal-oxide semiconductor (CMOS) image sensor).

Figure 3:
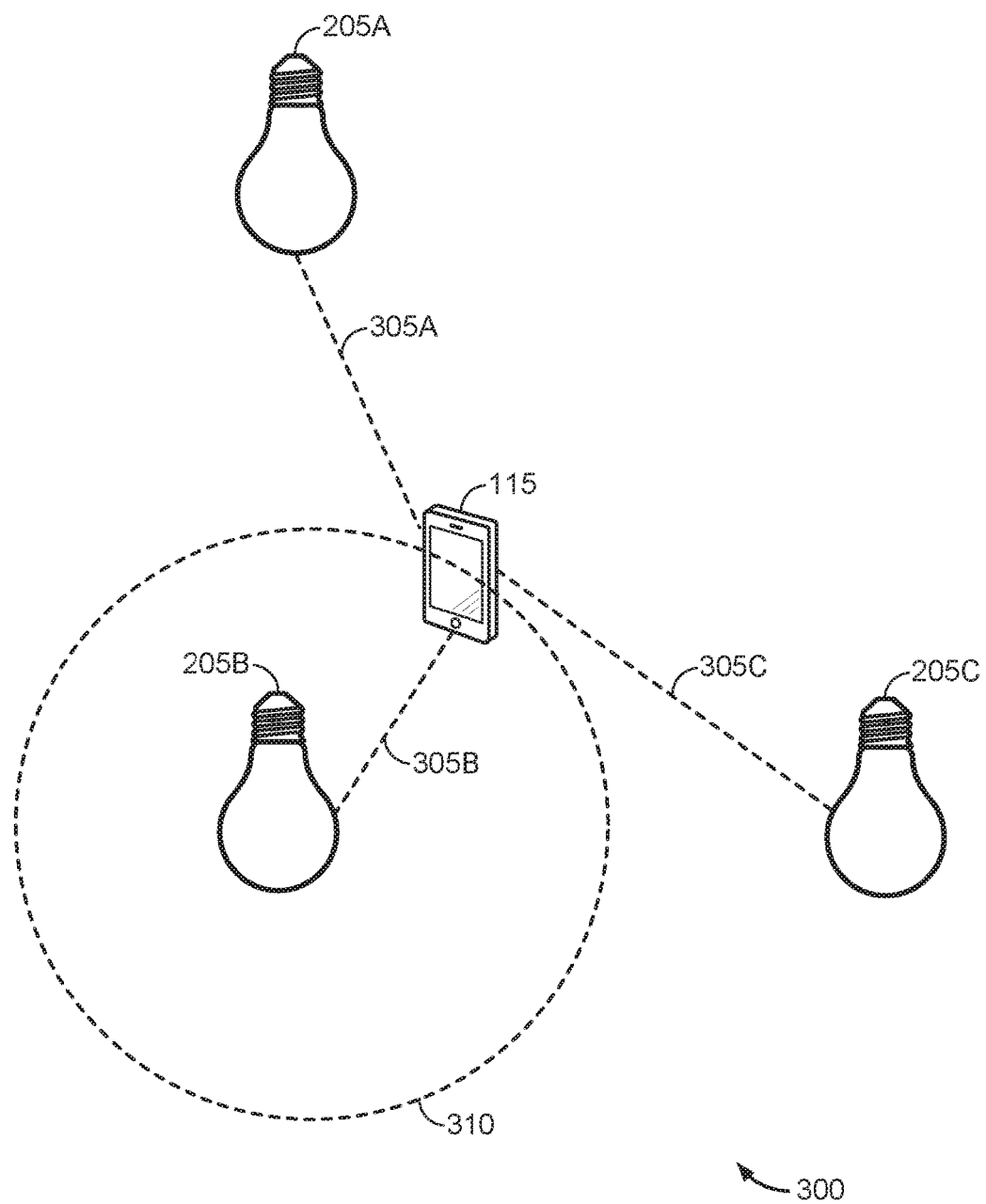
FIG. 3 provides a plan view illustrating a mobile device illuminated by three light sources in accordance with various aspects of the disclosure.

FIG. 3 provides a plan view 300 illustrating a mobile device 115 illuminated by three light sources 205A, 205B, and 205C. With reference to FIG. 2, the mobile device 115 may be an example of one of the mobile devices 115A and 115B described with reference to FIG. 2. By receiving and decoding the modulated light signal emitted by only one of the light sources (e.g., light source 205B), the mobile device 115 may determine a direction from the mobile device 115 to the light source 205B. By further identifying a location of the light source 205B, the mobile device 115 may estimate a distance 305B from the mobile device 115 to the light source 205B. The distance 305B may indicate that the mobile device 115 is positioned somewhere along the circumference 310.

In an aspect, by receiving and decoding the modulated light signal received from each of the three light sources 205A, 205B, and 205C, identifying a location of each of the three light sources 205A, 205B, and 205C as described herein, and identifying the angle of arrival of the light signal received from each light source 205A, 205B, and 205C, the mobile device 115 may not only estimate the distances 305A, 305B, 305C from the mobile device 115 to each light source 205A, 205B, and 205C, but may also determine a position (e.g., location) of the mobile device 115 (e.g., using trilateration) with a high degree of accuracy.

Alternatively, where the identification information contained in the light signal from the light source 205B includes information representing the size (e.g., dimensions of the light source such as 24 in×36 in, 12 in diameter, etc.) and shape (e.g., circle, square, rectangle, etc.) of the fixture containing the light source 205B and coordinates (e.g., x, y, and optionally z, relative to a floor plan of the venue in which the light source 205B is located) of at least one point (e.g., a corner) on the light fixture, the mobile device 115 may be able to determine its position within the venue based on identifying the at least one point on the light fixture, the orientation of the mobile device 115 with respect to the at least one point on the light fixture (using orientation sensors of the mobile device 115, e.g., an accelerometer and/or a gyroscope, and the information representing the shape of the light fixture), and the distance between the mobile device 115 and the at least one point on the light fixture (using the angle of arrival of the light signal received from each light source 205B and the information representing the size of the light fixture). Thus, the mobile device 115 may be able to determine its position based on information received from a single light source, here, the light source 205B.

Note that although the light sources 205 in FIGS. 2 and 3 are illustrated in the shape of a typical single incandescent bulb, as would be appreciated, the light sources 205 may be arrays of bulbs having any shape or individual bulbs having shapes other than the shape illustrated.

Figure 4:
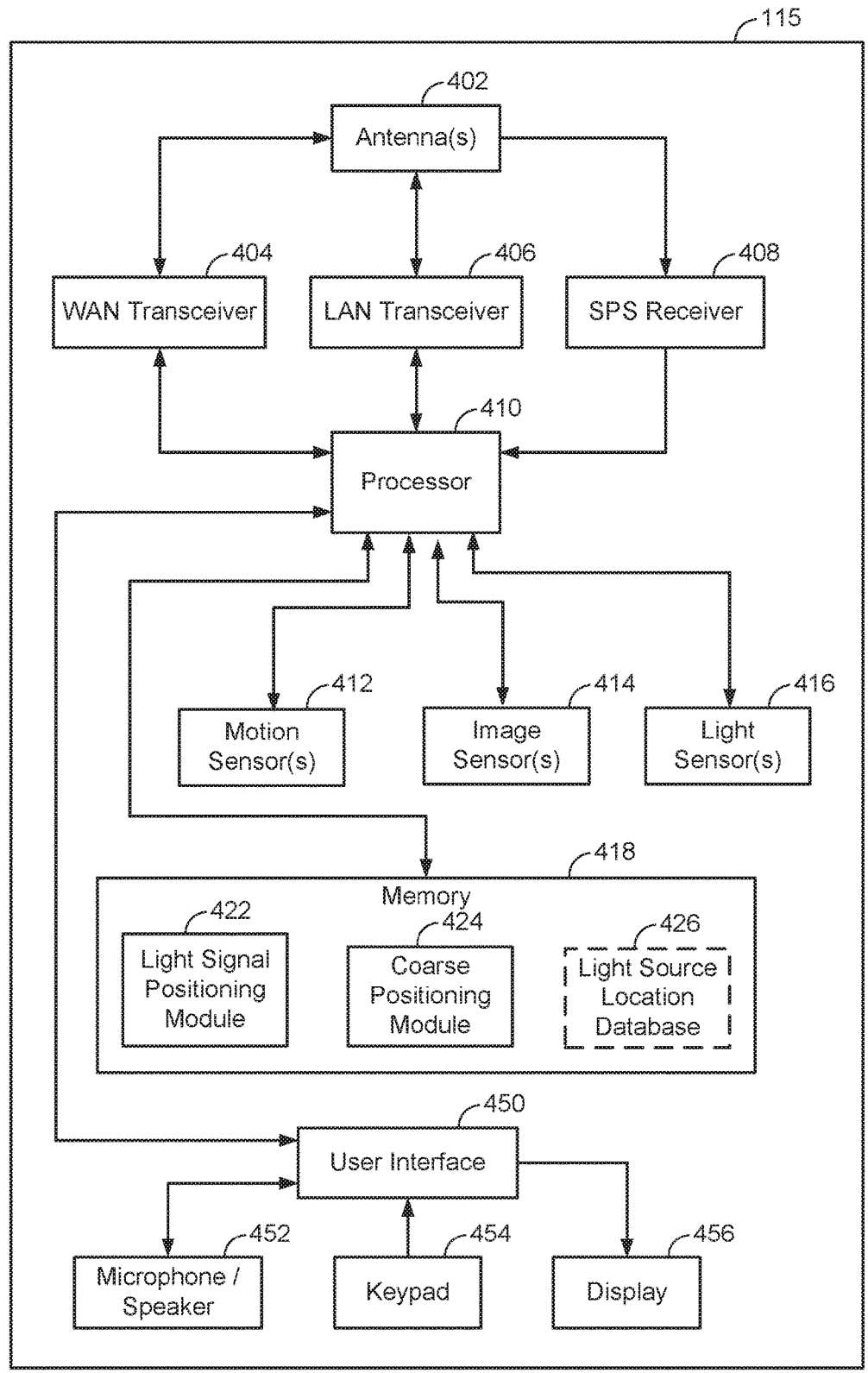
FIG. 4 illustrates an exemplary mobile device that may be used in an operating environment that can determine position using wireless techniques, according to one aspect of the disclosure.

FIG. 4 is a block diagram illustrating various components of an exemplary mobile device 115. For the sake of simplicity, the various features and functions illustrated in the box diagram of FIG. 4 are connected together using a common bus that is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 4 may be further subdivided or two or more of the features or functions illustrated in FIG. 4 may be combined.

The mobile device 115 may include one or more wide area network (WAN) transceiver(s) 404 that may be connected to one or more antennas 402. The WAN transceiver 404 comprises suitable devices, hardware, and/or software for communicating with and/or detecting signals to/from WAN access points 105, and/or directly with other wireless devices within the system 100. In one aspect, the WAN transceiver 404 may comprise a code division multiple access (CDMA) communication system suitable for communicating with a CDMA network of wireless base stations; however in other aspects, the wireless communication system may comprise another type of cellular telephony network, such as, for example, time division multiple access (TDMA) or the Global System for Mobile Communications (GSM). Additionally, any other type of wide area wireless networking technologies may be used, for example, WiMAX (IEEE 802.16), etc.

The mobile device 115 may also include one or more wireless local area network (WLAN) and/or personal area network (PAN) transceivers 406 that may be connected to the one or more antennas 402. The one or more WLAN/PAN transceivers 406 comprise suitable devices, hardware, and/ or software for communicating with and/or detecting signals to/from access points 105, and/or directly with other wireless devices within a network. In one aspect, the one or more WLAN/PAN transceivers 406 may include a Wi-Fi (802.11x) or Bluetooth® transceiver. Additionally, any other type of wireless networking technologies may be used, for example, Ultra Wide Band, ZigBee, wireless USB, etc.

A satellite positioning system (SPS) receiver 408 may also be included in the mobile device 115. The SPS receiver 408 may be connected to the one or more antennas 402 for receiving satellite signals. The SPS receiver 408 may comprise any suitable hardware and/or software for receiving and processing SPS signals. The SPS receiver 408 requests information and operations as appropriate from the other systems, and performs the calculations necessary to determine the mobile device's 115 position using measurements obtained by any suitable SPS algorithm.

One or more orientation sensors 412 may be coupled to a processor 410 to provide movement and/or orientation information that is independent of motion data derived from signals received by the WAN transceiver 404, the local area network (LAN) transceiver 406, and the SPS receiver 408. For example, the one or more orientation sensors 412 may comprise one or more accelerometers and/or a 3D accelerometer, a gyroscope, a geomagnetic sensor (e.g., a compass), a motion sensor, and/or any other type of movement detection sensor. Moreover, the one or more orientation sensors 412 may include a plurality of different types of devices and combine their outputs in order to provide motion information. For example, the one or more orientation sensors 412 may use a combination of a multi-axis accelerometer and orientation sensors to provide the ability to compute positions in 2-D and/or 3-D coordinate systems. Although not shown, the mobile device 115 may further include an altimeter (e.g., a barometric pressure altimeter).

One or more image sensors 414 may also be coupled to the processor 410. The one or more image sensors 414 may be image sensors containing an array of photodiodes (e.g., a complementary metal-oxide semiconductor (CMOS) image sensor), and may correspond to a front and/or a rear-facing camera of the mobile device 115.

One or more light sensors 416 (e.g., photosensors or photodetectors) may also be coupled to the processor 410. The one or more light sensors 416 may be photodiodes, photo transistors, etc.

The processor 410 may include one or more microprocessors, microcontrollers, and/or digital signal processors that provide processing functions, as well as other calculation and control functionality. The processor 410 may also be coupled to memory 418 for storing data and software instructions for executing programmed functionality within the mobile device 115. For example, the processor 410 may be operatively configurable based on instructions in the memory 418 to selectively initiate one or more routines that exploit motion data for use in other portions of the mobile device 115. The memory 418 may be on-board the processor 410 (e.g., within the same integrated circuit (IC) package), and/or the memory 418 may be external memory to the processor 410 and functionally coupled over a data bus.

A number of software modules and data tables may reside in memory 418 and be utilized by the processor 410 in order to manage both communications and positioning determination functionality as described herein. As illustrated in FIG. 4, memory 418 may include at least a light signal positioning module 422, a coarse positioning module 424, and an optional light source location database 426. As will be described further herein, the light source location database 426 may be populated with known locations of all or a subset of the light sources 205 installed in the venue in which the mobile device 115 is located. One should appreciate that the organization of the memory contents as shown in FIG. 4 is merely exemplary, and as such the functionality of the modules and/or data structures may be combined, separated, and/or be structured in different ways depending upon the implementation of the mobile device 115.

The processor 410, the one or more orientation sensors 412, and the coarse positioning module 424 may cooperatively perform positioning operations based on dead reckoning (DR) to estimate the position of the mobile device 115 when other methods of estimating the position of the mobile device 115 are not available, such as when the mobile device 115 is in an indoor environment. Dead reckoning is the process of calculating the current position of the mobile device 115 by using a previously determined position, or fix, and advancing that position based upon known or estimated speeds over elapsed time and course, for example, as sensed by the one or more orientation sensors 412. More specifically, one or more accelerometers of the one or more orientation sensors 412 and one or more gyroscopes of the one or more orientation sensors 412 continuously calculate the movement, orientation, and velocity of the mobile device 115 to calculate changes in position of the mobile device 115 from the last known position fix.

The processor 410, the one or more image sensors 414 and/or the one or more light sensors 416, and the light signal positioning module 422 may cooperatively perform positioning operations based on light signals from one or more light sources 205 to estimate the position of the mobile device 115. For example, the one or more image sensors 414 and/or the one or more light sensors 416 may receive and decode the light signal(s) to obtain identification information for the light source(s) 205. Based on the identification information, the WAN transceiver 404 and/or the LAN transceiver 406 may obtain the location(s) of the light source(s) 205 from a local server (e.g., a location server, such as location server 170, associated with the venue in which the mobile device 115 is located). Alternatively, if location information for the light source(s) 205 was previously downloaded and stored in the light source location database 426, the processor 410 can retrieve the location(s) of the light source(s) 205 from the light source location database 426. Based on the location of the light source(s) 205, the angle of arrival of the light signal, and optionally the size (e.g., dimensions), shape, orientation, coordinates of a point within the light source(s) 205, or any combination thereof, the light signal positioning module 422, as executed by the processor 410, may determine positioning information, such as the location of the mobile device 115.

While the modules shown in FIG. 4 are illustrated as being contained in the memory 418, it is recognized that in certain implementations such procedures may be provided for or otherwise operatively arranged using other or additional mechanisms. For example, all or part of the light signal positioning module 422 and/or the coarse positioning module 424 may be provided in firmware. Additionally, while in this example the light signal positioning module 422 and/or the coarse positioning module 424 are illustrated as being separate features, it is recognized, for example, that such procedures may be combined together as one procedure or perhaps with other procedures, or otherwise further divided into a plurality of sub-procedures.

The mobile device 115 may further include a user interface 450 that provides any suitable interface systems, such as a microphone/speaker 452, keypad 454, and display 456 that allows user interaction with the mobile device 115. The microphone/speaker 452 provides for voice communication services using the WAN transceiver 404 and/or the LAN transceiver 406. The keypad 454 comprises any suitable buttons for user input. The display 456 comprises any suitable display, such as, for example, a backlit liquid crystal display (LCD) display, and may further include a touch screen display for additional user input modes.

As used herein, the mobile device 115 may be any portable or movable device or machine that is configurable to acquire wireless signals transmitted from, and transmit wireless signals to, one or more wireless communication devices or networks. As shown in FIG. 1, the mobile device 115 is representative of such a portable wireless device. Thus, by way of example but not limitation, the mobile device 115 may include a radio device, a cellular telephone device, a computing device, a personal communication system (PCS) device, or other like movable wireless communication equipped device, appliance, or machine. The term "mobile device" is also intended to include devices which communicate with a personal navigation device (PND), such as by short-range wireless, infrared, wire line connection, or other connection, regardless of whether satellite signal reception, assistance data reception, and/or position-related processing occurs at the device or at the PND. Also, the term "mobile device" is intended to include all devices, including wireless devices, computers, laptops, tablets, smartphones, etc. that are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

An issue with VLC positioning (e.g., the mobile device determining its position based on light signals received from one or more VLC-enabled light sources 205) is that the identifiers of light sources 205 within the same venue may not be unique. For example, VLC bulb manufacturers may provide random identifiers for their VLC bulbs, and because the identifiers may be short, or because the mobile device 115 may only have time to demodulate a portion of the identifier, there may be duplicate identifiers within the same venue.

Figure 5:
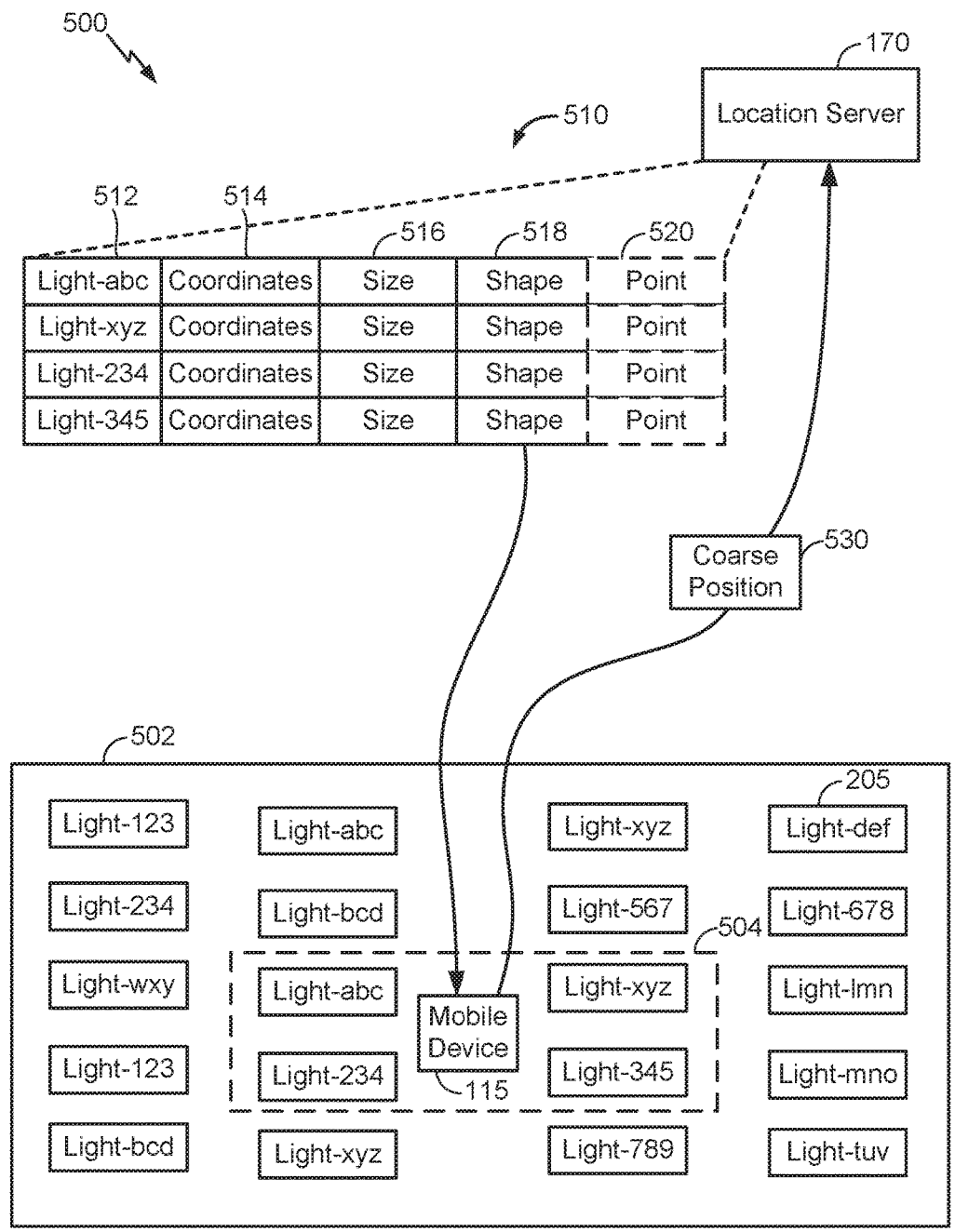
FIG. 5 illustrates an exemplary system according to at least one aspect of the disclosure.

FIG. 5 illustrates an exemplary system 500 according to at least one aspect of the disclosure. To address the above-noted issue, the mobile device 115 can track its coarse position 530 within a venue 502 using one or more non-VLC sources (e.g., dead reckoning, inertial navigation, terrestrial positioning, SPS positioning, fingerprint positioning, etc.). Terrestrial positioning may include trilateration based on signals received from one or more access points 105. Fingerprint positioning may include using signals detected in the environment of the mobile device 115, such as a detected base station identifier (BSID), service set identifier (SSID), medium access control identifier (MAC ID), etc. The mobile device 115 can additionally or alternatively track its coarse position 530 within the venue 502 based one or more "old" VLC positioning fixes (e.g., VLC positioning fixes that meet or exceed a time threshold). More specifically, where the mobile device 115 previously calculated one or more VLC-based position fixes, but the position uncertainty of the mobile device's 115 current position estimate has degraded due to the age of the previous one or more VLC-based position fixes, the mobile device 115 can still use the current position estimate based on the "old" VLC position fixes as its coarse position 530.

As illustrated in FIG. 5, the venue 502 includes a number of light sources 205 capable of transmitting VLC signals (e.g., an identifier of the light source 205, also referred to as a "VLC identifier") to be used for positioning operations. Each light source 205 has an identifier, and as shown in FIG. 5, the identifiers are not unique.

The mobile device 115 can download a map 510 of light sources 205 installed at the venue 502 to the light source location database 426. For each light source 205 in the map 510, the map 510 may include an identifier 512 of the light source 205, coordinates 514 of the light source 205, a size 516 (e.g., dimensions) of the light source 205, and/or a shape 518 of the light source 205. The coordinates 514 of the light source 205 may be the coordinates of the light source 205 within the venue 502, or the coordinates of a point on the light source 205. In the latter case, the map 510 may optionally include a description of the point in a point field 520. The coordinates 514, the size 516, the shape 518, and/or the point field 520 may be referred to herein individually as a "location identifier" of a light source 205, or collectively as "location information" or "location identifiers" of a light source 205.

In an aspect, rather than download the map 510 of all light sources 205 in the venue 502, the mobile device 115 can download the map 510 of a subset 504 of the light sources 205. The light sources 205 included in the subset 504 may be based on the coarse position 530 of the mobile device 115. More specifically, the mobile device 115 can send its coarse position 530 to the location server 170, which can identify the subset 504 of light sources 205 that may be visible to the mobile device 115, or that are within a certain distance from the mobile device 115.

Alternatively, the mobile device 115 can download the map 510 of all light sources 205 installed at the venue 502. In that case, the mobile device 115 can identify the subset 504 of light sources 205 that may be visible to the mobile device 115, or that are within a certain distance from the mobile device 115, based on the coarse position 530 of the mobile device 115. In this aspect, the mobile device 115 need not send its coarse position 530 to the location server 170.

At some point, the mobile device 115 may detect VLC signals from one or more of the light sources 205 in the venue 502, such as when the user removes the mobile device 115 from his or her pocket or purse. Specifically, the mobile device 115 may detect that it has been removed from the user's pocket or purse based on data from the orientation sensor(s) 412 and/or the light sensor(s) 416. Upon determining that it may be able to detect visible light sources 205, the mobile device 115 may turn on one or more of its image sensors 414 to detect VLC signals from the visible light sources 205. For example, if the mobile device 115 detects that it has been removed from a pocket or purse and is face up (also based on data from the orientation sensor(s) 412 and/or the light sensor(s) 416), it may turn on a front-facing image sensor 414. Alternatively, if the mobile device 115 detects that it is face down, it may turn on a rear-facing image sensor 414. If the mobile device 115 detects that it is being held sideways, it may turn on both a front-facing image sensor 414 and a rear-facing image sensor 414.

In response to being able to detect VLC signals from visible light sources 205, if the mobile device 115 has not already done so, it can download the map 510 of the subset 504 of nearby light sources 205, or identify the subset 504 of nearby light sources 205 from the map 510 stored in the light source location database 426.

Upon detecting VLC signals from a visible light source 205 (e.g., an identifier of the light source 205), the mobile device 115 demodulates at least a fragment of the identifier. The mobile device 115 can then match the fragment of the identifier received from the visible light source 205 to an identifier in the retrieved subset 504 of light sources 205. The mobile device 115 can do the same for all light sources 205 from which it is currently receiving VLC signals. Because there are a limited number of light sources 205 in the subset 504, there is less chance of the mobile device 115 erroneously identifying the light source(s) 205 from which it is receiving VLC signals, even where the mobile device 115 only demodulates a fragment of the detected VLC signals. For example, as illustrated in FIG. 5, the subset 504 of light sources 205 includes four light sources 205, having the identifiers "Light-abc," "Light-xyz," "Light-234," and "Light-345," none of which are duplicates. As such, if the mobile device 115 demodulates only a fragment of the identifier, for example, the last one to three characters of the VLC signals, from any of the light sources 205 in the subset 504, the mobile device 115 can uniquely/unambiguously identify these light sources 205 based on the fragment. In various embodiments, the fragment can have a static length, or the length of the fragment can be dynamically determined based upon the set of light source identifiers or other factors. Whether the fragment length is static or dynamic, the fragment length could be based upon a number of bits that can be demodulated in a period of time. For example, for a relatively small set of light sources corresponding to identifiers with no or few similar or identical light source identifiers, the fragment can be relatively small, possibly one, two, or three bits/characters. In another example, for a relatively large set of light sources or a set of light sources corresponding to identifiers with multiple light source identifiers that are similar or identical, the fragment can be relatively large. As used herein, "unambiguously" identifying a light source based on a fragment of a light source identifier can mean that a number of bits/characters in the fragment matching bits/characters in the light source identifier exceeds a threshold. In another embodiment, a fragment can unambiguously be mapped to a light source identifier if a percentage or ratio of a number of bits/characters of the fragment matching the light source identifier relative to a total number of bits/characters in the fragment exceeds a threshold. In another embodiment, a threshold number or a threshold percentage/ratio of bits/characters in sequence of the fragment matching a light source identifier can unambiguously identify the light source. For example, for a light source identifier of "010111011001" in a set of few light source identifiers or a set of light source identifiers that are generally dissimilar, a fragment of only three, four, or five bits/characters may be used to identify the light source identifier. The fragment could, for example, be considered to unambiguously identify the light source identifier if four out of five bits match the light source identifier. Hence, fragments "01011," "01010," and "11011" could all be considered matches to four of the first five bits in the light source identifier. While this illustration is provided with respect to the first five bits, it is understood that more generally, a match could be found anywhere in the light source identifier and provide an unambiguous match.

Note that the combination of two ambiguous fragments, each from one of two adjacent light sources 205, could also be used to unambiguously identify both light source identifiers/light sources 205 using their adjacency to rule out other light source identifiers/light sources 205 that do not satisfy the adjacency. For example, assume that a Fragment A is ambiguous and is next to a Fragment B that is also ambiguous. Fragment A might map to light source identifiers C, D, and E, and Fragment B might map to light source identifiers R, G, and F. However, only the light sources 205 identified by light source identifiers D and F are adjacent to each other. Thus, the mobile device 115 can determine from the map of light source identifiers (e.g., map 510) that Fragment A is from light source identifier D and Fragment B is from light source identifier F.

After identifying the light source 205 in the subset 504 from which the mobile device 115 is receiving VLC signals, the mobile device 115 can use the information associated with the identified light source 205 in the map 510 to determine its position, as described above. The mobile device 115 can then recalibrate its coarse position 530 to match the updated position.

As will be appreciated, the subset 504 of light sources 205 may include duplicate identifiers, or the chosen fragment size may not be large enough to unambiguously distinguish between the light sources 205 in the subset 504. Additionally, or alternatively, not every light source 205 may be capable of transmitting VLC signals, or the map 510 may not have the identifier for a given light source 205. As yet another alternative, a particular light source 205 may have been replaced with a different light source 205 having a different identifier, and the location server 170 may not have updated the map 510, or may be unable to update the map 510 (e.g., due to some incompatibility between the location server 170 and the new light source 205).

To address such issues, mobile devices 115 in communication with the location server 170 can assist the location server 170 in identifying unidentified light sources 205. Alternatively, the mobile devices 115 may simply update their local versions of the map 510. For example, a mobile device 115 can create its own map of light sources 205 stored in the light source location database 426 as it encounters them in a venue. The mobile device 115 can associate its coarse position with the identifier (if available) of each detected light source 205 and, optionally, other information about the light source 205, such as its shape and size (if determinable) and/or the radio frequency (RF) signature at the location of each light source 205. The mobile device 115 can then cross-reference this information with information in the map 510 from the location server 170 to fill in any gaps in the map 510.

For example, if a mobile device 115 is at a location where there are three visible light sources 205 and the information for two of those light sources 205 is on the map 510 (or subset 504) and the third is not, the mobile device 115 can detect the identifier of the third light source 205, and optionally its shape, and add an entry for the third light source 205 to the map 510 (or subset 504). The entry may include the detected identifier, an estimated position of the light source 205 based on the coarse position 530 of the mobile device 115 (e.g., as determined based on the VLC positioning techniques described above with reference to FIGS. 2 and 3), and the shape of the light source 205 (if determined). The mobile device 115 may have identified the two known light sources 205 based on its coarse position 530, as discussed above.

As a similar example, if a mobile device 115 is at a location where there are three visible light sources 205 and the identifiers for two of those light sources 205 match identifiers in the map 510 (or subset 504) but the third does not (e.g., where the light source 205 has been replaced by a new light source 205 with a different identifier), the mobile device 115 can detect the identifier of the third light source 205, and optionally its shape, and update the identifier in the entry for the third light source 205 in the map 510 (or subset 504). The mobile device 115 may have identified the two known light sources 205 based on its coarse position 530, as discussed above.

As another example, if a mobile device 115 is at a location where there are three visible light sources 205 and two of those light sources 205 are transmitting identifiers by the third is not, the mobile device 115 can add an entry for the third light source 205 to the map 510 (or subset 504). The mobile device 115 can create an identifier for the third light source 205 that is, for example, a combination of the associated coarse position 530 and the RF signature at that position. The entry may include the created identifier, an estimated position of the light source 205 based on the coarse position 530 of the mobile device 115 (e.g., as determined based on the VLC positioning techniques described above with reference to FIGS. 2 and 3), and the shape of the light source 205 (if determined). Again, the mobile device 115 may have identified the two known light sources 205 based on its coarse position 530, as discussed above.

As mentioned above, in some cases, there may be duplicate identifiers in the subset 504, or the chosen fragment size may not be large enough to unambiguously distinguish between the light sources 205 in the subset 504. In such a situation, the mobile device 115 attempts to determine from which of the light sources 205 in the subset 504 it is receiving the duplicate identifier. The mobile device 115 may use other information in the map 510, such as size 516 and shape 518, to determine the correct entry in the map 510 for the detected identifier. The mobile device 115 may also use its coarse position 530 to determine to which coordinates 514 it is closest.

As yet another option, the mobile device 115 may use the identifier of an adjacent light source 205 to determine to which light source identifier in the subset 504 the demodulated fragment maps. For example, where the demodulated fragment of a light source identifier ambiguously maps to a light source identifier within the subset 504, the mobile device 115 can demodulate a second fragment of a second light source identifier of a second light source 205 adjacent to the light source 205 from which the mobile device 115 demodulated the first fragment. The mobile device 115 can match the second fragment to a light source identifier in the subset 504 and then determine which of the adjacent light sources 205 have a fragment of an identifier that matches the first fragment. The mobile device 115 can then determine its fine position (e.g., a second position having a position accuracy greater than the position accuracy of the coarse position 530) based on unambiguously having identified the first light source. Since the probability of two light sources 205 adjacent to each other to both have light source identifier fragments that are ambiguous is low, even if the first fragment does not unambiguously map to a light source identifier, the second fragment is likely to unambiguously map to a light source identifier, and hence the first light source identifier (corresponding to the first fragment) may be identified after the second light source identifier (corresponding to the second fragment) is identified, for example, by proximity to the unambiguously identified second light source identifier. Furthermore, as noted above, even if two adjacent light sources are both ambiguous, their adjacency can help unambiguously identify both the first and the second light source using the ambiguous first fragment in conjunction with the adjacent second fragment.

The mobile device 115 may also use the sequence in which it detected light sources 205 in the subset 504, and the corresponding locations of those light sources 205, to determine the correct entry in the map 510. In other words, the mobile device 115 may use a sequence of identifiers of light sources 205 previously detected by the mobile device 115 and, optionally, a direction of travel of the mobile device 115 in the venue, to determine from which of the light sources 205 in the subset 504 it is receiving the duplicate identifier/fragment. As an example, if the mobile device 115 detects a first light source 205 in the subset 504 at a first location, a second light source 205 at a second location, and then detects a third light source 205 at a third location that has the same identifier/fragment as a fourth light source 205 in the subset 504, the mobile device 115 may determine which of the third and fourth light sources 205 it is likely receiving VLC signals from based on the locations of the two light sources 205 in the subset 504. It is understood that for the discussion above, the "fourth" light source 205 could be any light source in the subset 504, and the third and fourth light sources may or may not be adjacent. Similarly, the first, second, and third light sources may or may not be adjacent, however, in some embodiments, based on the map, they are disposed relative to each other such that a feasible path within the venue could result in the sequence of detecting the first light source before the second light source and the second light source before the third light source.

For example, if the location of the third light source 205 is in the same direction of travel as the first and second light sources 205, it is likely the light source from which the mobile device 115 is receiving the VLC identifier. As another example, if the location of the third light source 205 is further away from the location of the last known light source 205 than the mobile device 115 likely traveled since detecting the last known light source (e.g., based on data from the orientation sensor(s) 412 and/or the coarse position 530) but the location of the fourth light source 205 is within the distance from the location of the last known light source 205 than the mobile device 115 likely traveled since detecting the last known light source, the mobile device 115 is likely receiving the VLC identifier from the fourth light source 205.

Figure 6:
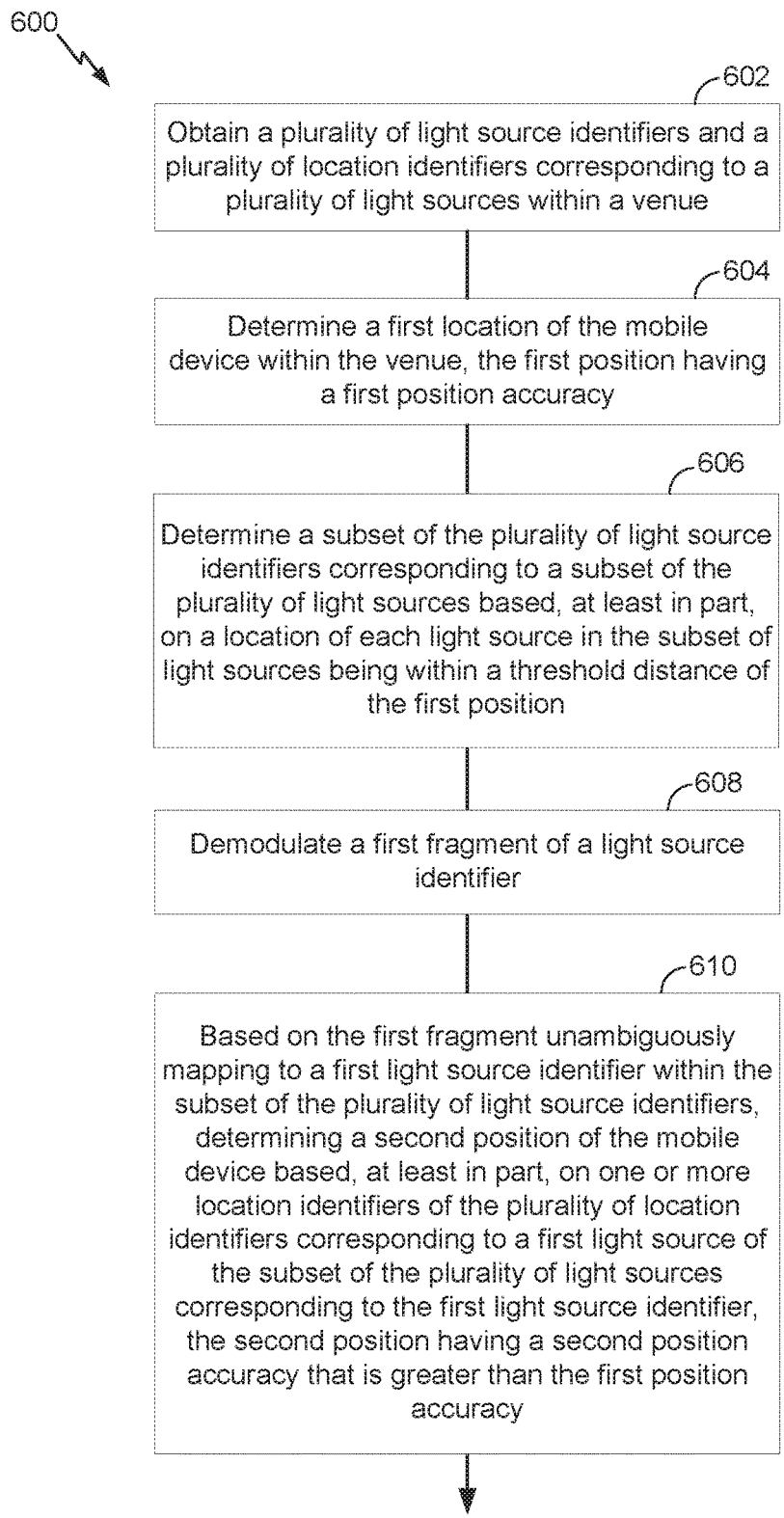
FIG. 6 illustrates an exemplary flow for tracking a position of a mobile device within a venue according to at least one aspect of the disclosure.

FIG. 6 illustrates an exemplary flow 600 for tracking a position of the mobile device 115 within a venue, such as venue 502, according to at least one aspect of the disclosure. The flow 600 may be performed by the mobile device 115.

At 602, the mobile device 115 (e.g., processor 410 in conjunction with the WAN transceiver 404 or the LAN transceiver 406, or processor 410 in conjunction with memory 418, specifically, light source location database 426) obtains a plurality of light source identifiers and a plurality of location identifiers corresponding to a plurality of light sources 205 within the venue 502. Each light source identifier (e.g., each identifier 512 in map 510) and each location identifier (e.g., each of coordinates 514, size 516, and/or shape 518 in map 510) correspond to a light source 205 of the plurality of light sources 205. In an aspect, the plurality of light source identifiers and the plurality of location identifiers may be obtained by downloading the map 510 of all light sources 205 installed at the venue 502 (where the plurality of light sources 205 are all light sources 205 installed at the venue 502).

At 604, the mobile device 115 (e.g., processor 410 in conjunction with the WAN transceiver 404, the LAN transceiver 406, and/or the SPS receiver 408) determines a first (e.g., coarse) position based, at least in part, on measured wireless signals. The first/coarse position may have a first position accuracy. As discussed above with reference to FIG. 5, a coarse position may be a position of the mobile device 115 calculated based on one or more non-VLC sources (e.g., dead reckoning, inertial navigation, terrestrial positioning, SPS positioning, fingerprint positioning, etc.) or one or more "old" VLC positioning fixes where the position uncertainty is above a threshold.

At 606, the mobile device 115 (e.g., processor 410) determines a subset of the plurality of light source identifiers corresponding to a subset of the plurality of light sources 205 (e.g., subset 504) based, at least in part, upon the location (as indicated by the corresponding location identifiers) of each light source 205 in the subset of light sources 205 being within a threshold distance of the first/coarse position. In an aspect, the mobile device 115 may obtain the subset of the plurality of light source identifiers from the map 510 obtained at 602.

At 608, upon determining that an image sensor (e.g., image sensor 414) is detecting light emitted by one or more light sources 205 (e.g., is not in a pocket or purse), the mobile device 115 (e.g., processor 410 in conjunction with the light signal positioning module 422 or the light sensor(s) 416) demodulates a first fragment of a light source identifier. Note that the mobile device 115 may not need to fully demodulate the received light source identifiers; instead, it may simply demodulate enough of the identifier(s) to differentiate them from each other. Alternatively, the size of the demodulated fragment may be based on how quickly the mobile device 115 can demodulate light source identifiers. As the system can be lossy, there are often missing bits, and the modulation rate is also fairly slow. Thus, if the mobile device 115 only has a limited subset of the plurality of light source identifiers, then that should reduce the number of bits that the mobile device 115 has to successfully demodulate to get an identifier match. In some embodiments, the first fragment comprises a number of bits of the first light source identifier that can be demodulated within a threshold period of time.

At 610, based on the first fragment unambiguously mapping to a first light source identifier within the subset of the plurality of light source identifiers (e.g., subset 504), the mobile device 115 (e.g., processor 410 in conjunction with the light signal positioning module 422) determines a second (e.g., fine) position of the mobile device 115 based, at least in part, on one or more location identifiers of the plurality of location identifiers (e.g., at least one of coordinates 514, size 516, and/or shape 518) corresponding to a first light source 205 of the subset of the plurality of light sources corresponding to the first light source identifier unambiguously mapped to the first fragment. The second position will have a second position accuracy that is greater than the first position accuracy. The second position having a second position accuracy that is greater than the first position accuracy means that the second position has a lower error estimate, a lower uncertainty, or combination thereof. The mobile device 115 may know the size and orientation of the one light source 205 based on the plurality of location identifiers obtained at 602. More specifically, based on the shape and size of the one light source 205 in the image of the light source captured by the image sensor 414 (or camera) and the location of the one light source 205, the mobile device 115 can determine its location with just the one light source 205, and even more so with two light sources 205.

Although not illustrated in FIG. 6, if the first fragment ambiguously maps to the first light source identifier within the subset of the plurality of light source identifiers, the mobile device 115 can demodulate a second fragment of a second light source identifier of a second light source 205 adjacent to the first light source 205, match the first fragment to the first light source identifier based on the first light source being adjacent to the second light source and the first fragment matching a fragment of the first light source identifier, and determine the second position of the mobile device based, at least in part, on the one or more location identifiers corresponding to the first light source 205.

Further, if the mobile device 115 also knows its orientation and heading, it can predict the sequence of light sources 205 it will encounter, and thus, need only occasionally demodulate light source identifiers to verify that it is still moving in the same direction or in the same area of the venue. Alternatively, the mobile device 115 can demodulate only enough of a sequence of light source identifiers that it can determine that the expected light source identifier matches with the sequence of light source identifiers being demodulated. The mobile device 115 may also skip light source identifiers and demodulate only when it's not sure about the count of successive light sources 205, or when there are alternative paths in the venue (e.g., a branch in a hallway) and the mobile device 115 needs to determine which path was taken. Meanwhile, the mobile device 115 can focus on distance and angle to each light source 205 to determine its location.

In an aspect, the mobile device 115 can also demodulate all the light source identifiers completely, or demodulate only light source identifiers that do not match with the expected light source identifier in the expected sequence of identifiers so that the identifiers and their locations on the map (e.g., map 510) can be kept up to date. That is, the mobile device 115 can send unexpected identifiers plus the locations of the light source 205 (on the venue map) back to the location server 170 so that the identifiers can be updated.

In an aspect, the mobile device 115 can detect whether the light source 205 at a given location is either not in the subset of identifiers or is misidentified (e.g., if the light source 205 has been replaced or updated since the map 510 was last updated). In such a case, the mobile device 115 can send a notification to the location server 170 with the actual identifier and the location server 170 can update the identifier before sending the map 510 to another mobile device.

More specifically, one of the benefits of the mechanism described herein is the ability to use a random set of light sources 205 in which some of the identifiers may be duplicated and some of the identifiers may change (e.g., if a light source 205 has been replaced or updated since the map 510 was last updated) without requiring a lot of central control and manipulation/record keeping. Assuming that a light source 205 is only changed periodically, the mobile device 115 should be able to determine the identifier associated with any given light source 205 by a) detecting the mismatch for that location and b) fully demodulating the detected identifier.

In an aspect, although not illustrated in FIG. 6, the mobile device 115 can determine the light source identifier of an adjacent light source 205 based on the demodulated fragment of the light source identifier and the plurality of light source identifiers. More specifically, the mobile device 115 can look up which light sources 205 are adjacent to the identified light source 205 and use that information to determine/predict the light source identifier for the adjacent light source 205. In fact, if the mobile device 115 does not need an exact location, it can simply count the light sources 205 as it moves within the venue and not demodulate at all until it needs an exact location.

Figure 7:
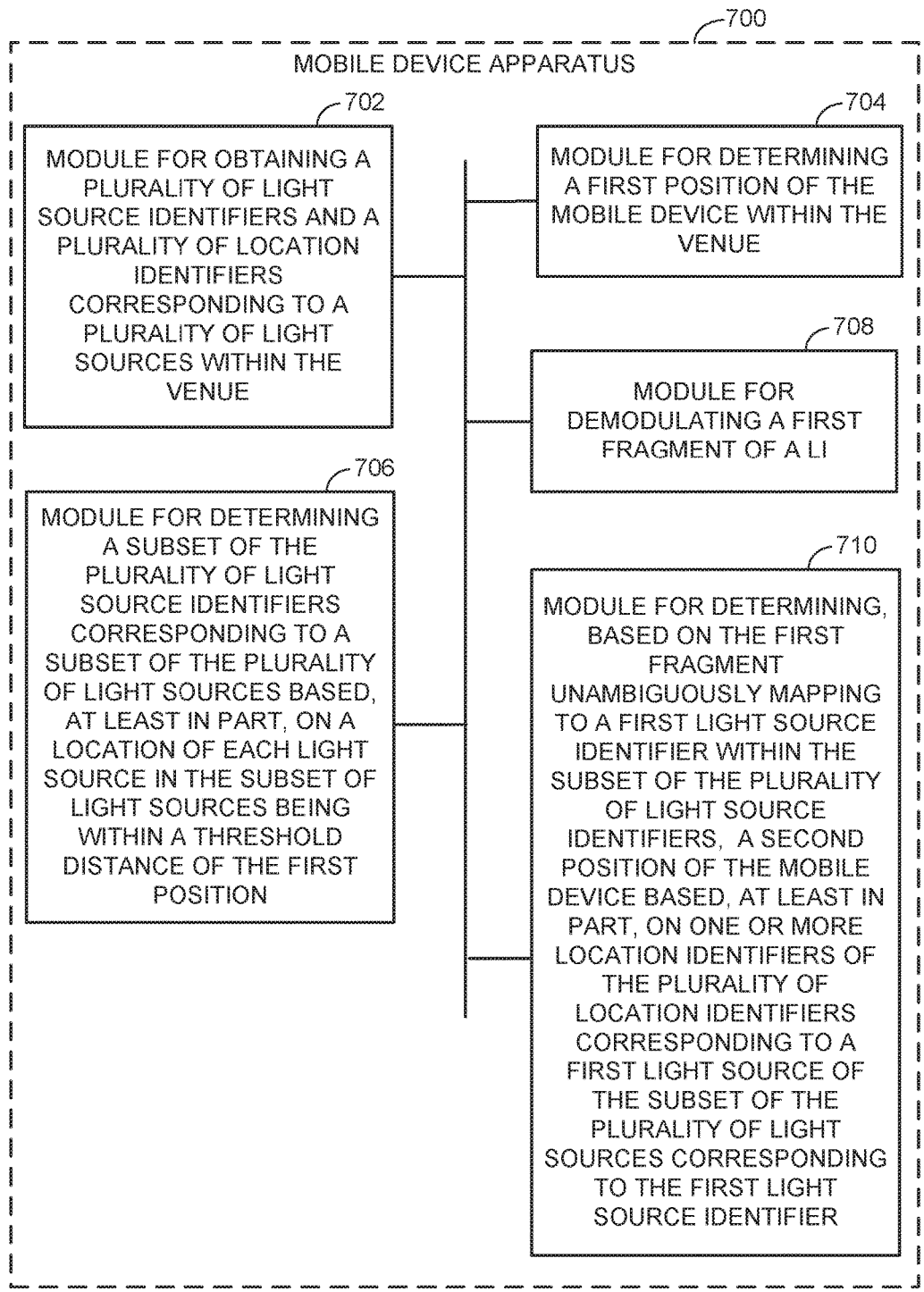
FIG. 7 is a simplified block diagram of several sample aspects of an apparatus configured to support operations as taught herein.

FIG. 7 illustrates an example mobile device apparatus 700 represented as a series of interrelated functional modules. A module for obtaining 702 may correspond at least in some aspects to, for example, a processing system in conjunction with a communication device (e.g., processor 410 in conjunction with the WAN transceiver 404 or the LAN transceiver 406, or processor 410 in conjunction with memory 418, specifically, light source location database 426), as discussed herein. A module for determining 704 may correspond at least in some aspects to, for example, a processing system in conjunction with a communication device (e.g., processor 410 in conjunction with the WAN transceiver 404, the LAN transceiver 406, and/or the SPS receiver 408), as discussed herein. A module for determining 706 may correspond at least in some aspects to, for example, a processing system (e.g., processor 410), as discussed herein. A module for demodulating 708 may correspond at least in some aspects to, for example, a processing system in conjunction with a positioning device (e.g., processor 410 in conjunction with the light signal positioning module 422), as discussed herein. A module for determining 710 may correspond at least in some aspects to, for example, a processing system (e.g., processor 410), as discussed herein. A module for determining 712 may correspond at least in some aspects to, for example, a processing system in conjunction with a positioning device (e.g., processor 410 in conjunction with the light signal positioning module 422), as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random-access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for tracking a position of a mobile device within a venue, comprising:
   obtaining, by the mobile device, a plurality of light source identifiers and a plurality of location identifiers corresponding to a plurality of light sources within the venue, each light source identifier and each location identifier corresponding to a light source of the plurality of light sources;
   determining, by the mobile device, a first position of the mobile device within the venue, the first position having a first position accuracy;
   determining, by the mobile device, a subset of the plurality of light source identifiers corresponding to a subset of the plurality of light sources based, at least in part, on a location of each light source in the subset of light sources being within a threshold distance of the first position;
   demodulating, by the mobile device, a first fragment of a light source identifier; and
   based on the first fragment unambiguously mapping to a first light source identifier within the subset of the plurality of light source identifiers, determining, by the mobile device, a second position of the mobile device based, at least in part, on one or more location identifiers of the plurality of location identifiers corresponding to a first light source of the subset of the plurality of light sources corresponding to the first light source identifier, the second position having a second position accuracy that is greater than the first position accuracy.

2. The method of claim 1, further comprising:
   based on the first fragment ambiguously mapping to the first light source identifier within the subset of the plurality of light source identifiers:
      demodulating, by the mobile device, a second fragment of a second light source identifier of a second light source adjacent to the first light source;
      matching, by the mobile device, the first fragment to the first light source identifier based on the first light source being adjacent to the second light source and the first fragment matching a fragment of the first light source identifier; and
      determining, by the mobile device, the second position of the mobile device based, at least in part, on the one or more location identifiers corresponding to the first light source.

3. The method of claim 2, wherein the first fragment maps to more than one light source identifier of the subset of the plurality of light source identifiers.

4. The method of claim 1, wherein the first fragment comprises a number of bits of the first light source identifier that can be demodulated within a threshold period of time.

5. The method of claim 1, wherein the first light source comprises at least one visible light communication (VLC) light source.

6. The method of claim 1, wherein the one or more location identifiers corresponding to the first light source comprises location coordinates of the first light source within the venue, dimensions of the first light source, orientation of the first light source, shape of the first light source, or any combination thereof.

7. The method of claim 1, wherein the threshold distance of the first position of the mobile device is based on the first position accuracy of the first position of the mobile device.

8. The method of claim 1, wherein the first position is based upon a number of light sources between the first light source and a light source having a location known to the mobile device.

9. The method of claim 7, wherein the first position is further based upon heading measurements of the mobile device.

10. The method of claim 1, wherein the first position is based upon personal dead reckoning measurements from a light source of the plurality of light sources having a location known to the mobile device.

11. The method of claim 1, further comprising:
    determining the first light source identifier of the first light source based, at least in part, on a sequence of identifiers of light sources previously detected by the mobile device and a direction of travel of the mobile device in the venue.

12. The method of claim 1, wherein the obtaining the plurality of light source identifiers and the plurality of location identifiers comprises receiving, at the mobile device, the plurality of light source identifiers and the plurality of location identifiers from a server.

13. The method of claim 1, wherein determining the second position of the mobile device comprises:
    determining the second position of the mobile device based on a position of a fixture containing the first light source, a relative angle to the fixture containing the first light source, an orientation of the mobile device to the fixture containing the first light source, an image of the fixture containing the first light source captured by a camera of the mobile device, or any combination thereof.

14. The method of claim 13, wherein determining the second position of the mobile device comprises:
    determining the second position of the mobile device based on the position of the first light source, a position of a second light source, and a position of at least one other light source in the subset of the plurality of light sources.

15. The method of claim 1, wherein the first position is based upon measured wireless signals.

16. The method of claim 15, wherein the measured wireless signals comprise wireless local area network (WLAN) signals, cellular network signals, satellite positioning system (SPS) signals, or any combination thereof.

17. An apparatus for tracking a position of a mobile device within a venue, comprising:
- a light sensor;
- a transceiver configured to obtain a plurality of light source identifiers and a plurality of location identifiers corresponding to a plurality of light sources within the venue, each light source identifier and each location identifier corresponding to a light source of the plurality of light sources; and
- at least one processor configured to:
  - determine a first position of the mobile device within the venue, the first position having a first position accuracy;
  - determine a subset of the plurality of light source identifiers corresponding to a subset of the plurality of light sources based, at least in part, on a location of each light source in the subset of light sources being within a threshold distance of the first position;
  - demodulate a first fragment of a light source identifier detected by the light sensor; and
  - determine, based on the first fragment unambiguously mapping to a first light source identifier within the subset of the plurality of light source identifiers, a second position of the mobile device based, at least in part, on one or more location identifiers of the plurality of location identifiers corresponding to a first light source of the subset of the plurality of light sources corresponding to the first light source identifier, the second position having a second position accuracy that is greater than the first position accuracy.

18. The apparatus of claim 17, wherein the at least one processor is further configured to:
- based on the first fragment ambiguously mapping to the first light source identifier within the subset of the plurality of light source identifiers:
  - demodulate a second fragment of a second light source identifier of a second light source adjacent to the first light source;
  - match the first fragment to the first light source identifier based on the first light source being adjacent to the second light source and the first fragment matching a fragment of the first light source identifier; and
  - determine the second position of the mobile device based, at least in part, on the one or more location identifiers corresponding to the first light source.

19. The apparatus of claim 17, wherein the first light source comprises at least one visible light communication (VLC) light source.

20. The apparatus of claim 17, wherein the at least one location identifier corresponding to the first light source comprises location coordinates of the first light source within the venue, dimensions of the first light source, orientation of the first light source, shape of the first light source, or any combination thereof.

21. The apparatus of claim 17, wherein the threshold distance of the first position of the mobile device is based on the first position accuracy of the first position of the mobile device.

22. The apparatus of claim 17, wherein the first position is based upon a number of light sources between the first light source and a light source of having a location known to the mobile device.

23. The apparatus of claim 22, wherein the first position is further based upon heading measurements of the mobile device.

24. The apparatus of claim 17, wherein the first position is based upon personal dead reckoning measurements from a light source of the plurality of light sources having a location known to the mobile device.

25. The apparatus of claim 17, wherein the at least one processor is further configured to:
- determine the first light source identifier of the first light source based, at least in part, on a sequence of identifiers of light sources previously detected by the mobile device and a direction of travel of the mobile device in the venue.

26. The apparatus of claim 17, wherein the at least one processor being configured to determine the second position of the mobile device comprises the at least one processor being configured to:
- determine the second position of the mobile device based on a position of a fixture containing the first light source, a relative angle to the fixture containing the first light source, an orientation of the mobile device to the fixture containing the first light source, an image of the fixture containing the first light source captured by a camera of the mobile device, or any combination thereof.

27. The apparatus of claim 17, wherein the at least one processor being configured to determine the second position of the mobile device comprises the at least one processor being configured to:
- determine the second position of the mobile device based on the position of the first light source, a position of a second light source, and a position of at least one other light source in the subset of the plurality of light sources.

28. The apparatus of claim 17, wherein the light sensor comprises a camera.

29. An apparatus for tracking a position of a mobile device within a venue, comprising:
- a communication means configured to obtain a plurality of light source identifiers and a plurality of location identifiers corresponding to a plurality of light sources within the venue, each light source identifier and each location identifier corresponding to a light source of the plurality of light sources; and
- a processing means configured to:
  - determine a first position of the mobile device within the venue, the first position having a first position accuracy;
  - determine a subset of the plurality of light source identifiers corresponding to a subset of the plurality of light sources based, at least in part, on a location of each light source in the subset of light sources being within a threshold distance of the first position;
  - demodulate a fragment of a light source identifier; and
  - determine, based on the fragment unambiguously mapping to a light source identifier within the subset of the plurality of light source identifiers, a second position of the mobile device based, at least in part, on one or more location identifiers of the plurality of location identifiers corresponding to a light source of the subset of the plurality of light sources corresponding to the light source identifier, the second position having a second position accuracy that is greater than the first position accuracy.

30. A non-transitory computer-readable medium for tracking a position of a mobile device within a venue, comprising:
- at least one instruction to cause the mobile device to obtain a plurality of light source identifiers and a plurality of location identifiers corresponding to a plurality of light sources within the venue, each light source identifier and each location identifier corresponding to a light source of the plurality of light sources;
at least one instruction to cause the mobile device to determine a first position of the mobile device within the venue, the first position having a first position accuracy;
at least one instruction to cause the mobile device to determine a subset of the plurality of light source identifiers corresponding to a subset of the plurality of light sources based, at least in part, on a location of each light source in the subset of light sources being within a threshold distance of the first position;
at least one instruction to cause the mobile device to demodulate a fragment of a light source identifier; and
at least one instruction to cause the mobile device to determine, based on the fragment unambiguously mapping to a light source identifier within the subset of the plurality of light source identifiers, a second position of the mobile device based, at least in part, on one or more location identifiers of the plurality of location identifiers corresponding to a light source of the subset of the plurality of light sources corresponding to the light source identifier, the second position having a second position accuracy that is greater than the first position accuracy.

* * * * *